Jan. 14, 1969　　　　H. M. GIEPEN　　　　3,421,432
ELECTRIC BROILER
Filed Oct. 26, 1966　　　　　　　　　Sheet _1_ of INVENTOR
Hubert M. Giepen
by McDougall, Hersh, Scott
and Ladd　Att'ys

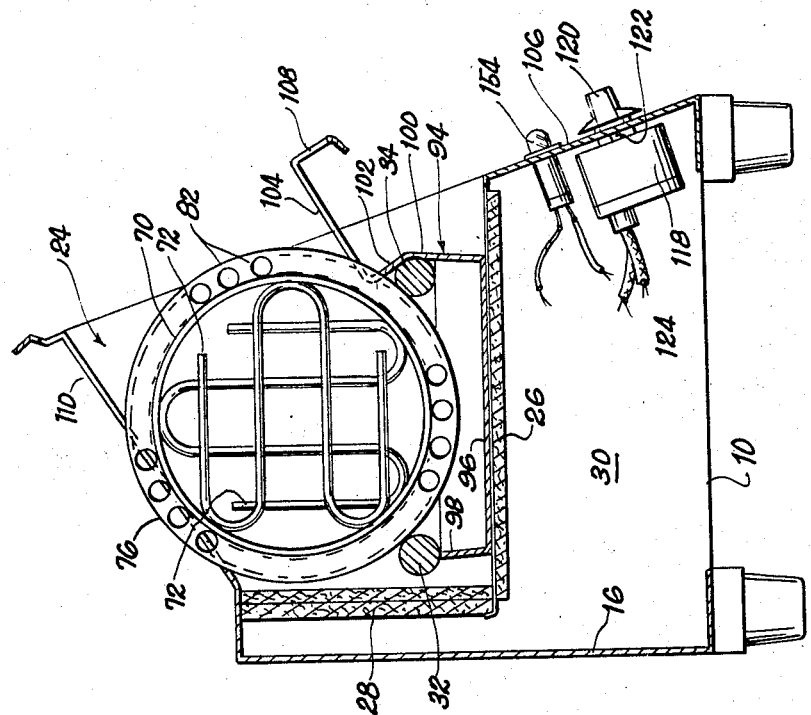
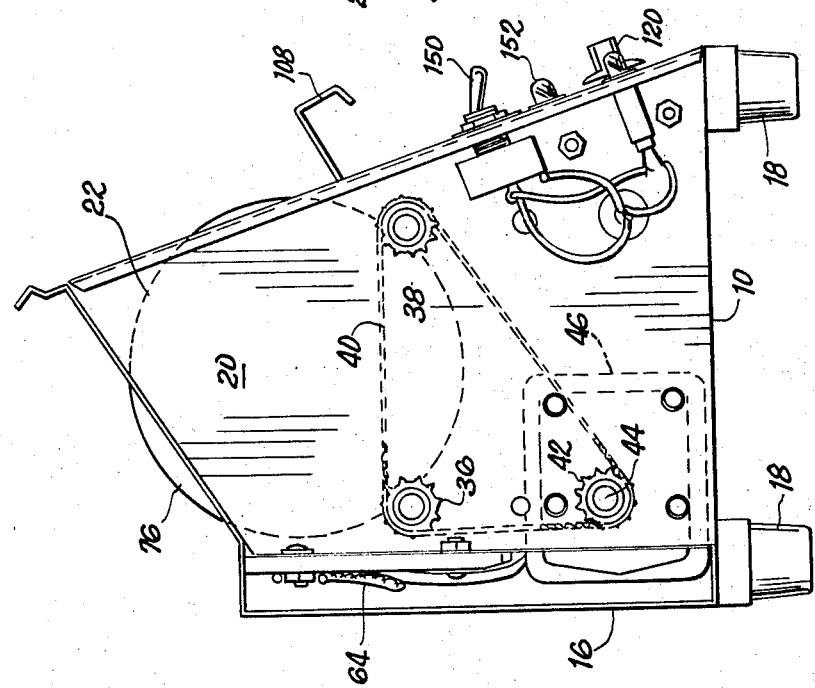

Jan. 14, 1969    H. M. GIEPEN    3,421,432
ELECTRIC BROILER

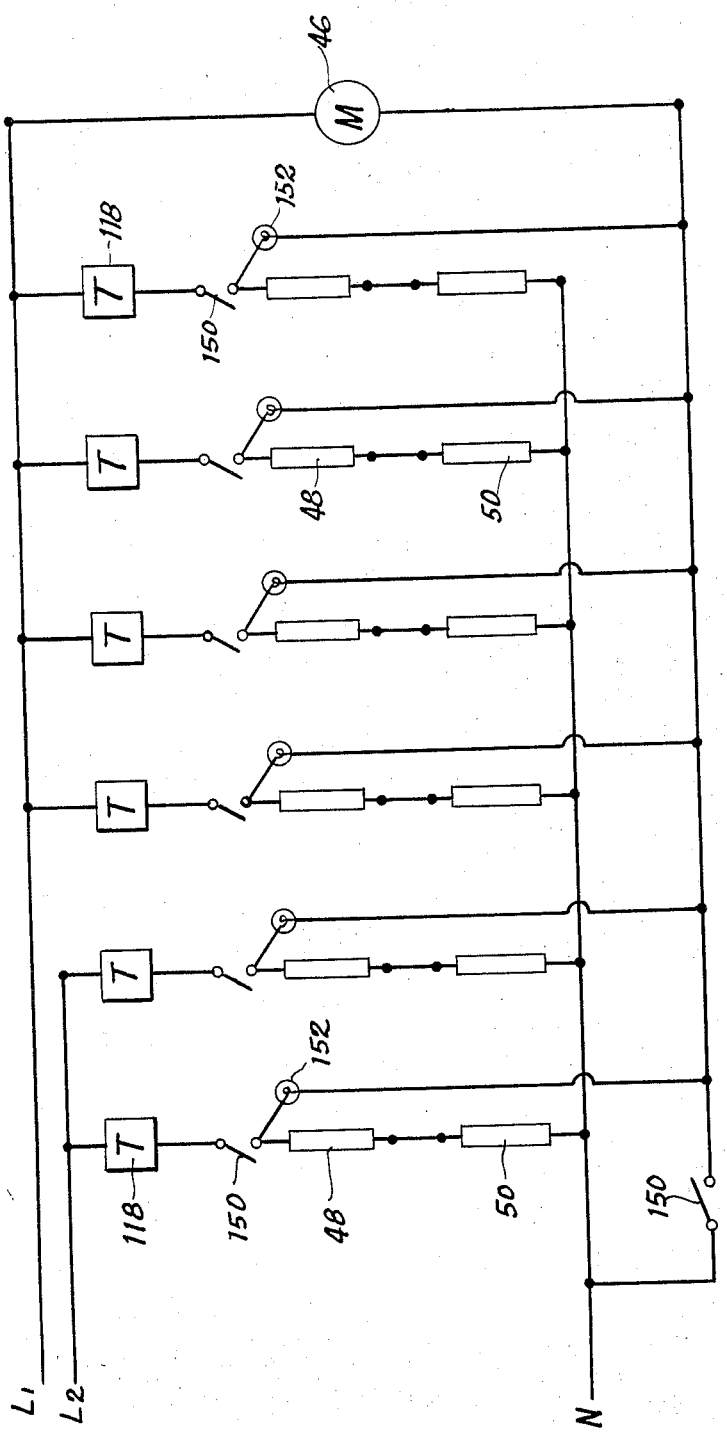

United States Patent Office 3,421,432
Patented Jan. 14, 1969

3,421,432
ELECTRIC BROILER
Hubert M. Giepen, 6939 S. Bennett Ave., Chicago, Ill. 60649
Filed Oct. 26, 1966, Ser. No. 589,572
U.S. Cl. 99—332          10 Claims
Int. Cl. A47j 27/62

ABSTRACT OF THE DISCLOSURE

A broiler embodying a pair of horizontally disposed, laterally spaced apart parallel rollers and means operatively engaging at least one of the rollers for the rotational movement thereof about its axis and at least one pair of heating elements mounted immediately above the rollers in closely spaced apart axial relation with the heating elements arranged to direct heat towards the space in between, an open cage having a width less than the spaced relationship between the heating elements and having an outer portion of circular shape dimensioned to have a diameter greater than the spaced relationship between the rollers to enable the cage to be displaced onto and off the rollers between the heating elements with the cage cradled between the rollers to effect rotational movement thereof responsive to rotational movement of the rollers, means for opening and closing the cage for access to the interior thereof for introducing a product to be broiled into the cage, means communicating the heating elements to a power source for the generation of heat and means for controlling the operation of the heating elements in response to the amount of broiling desired to be effected and in which, in the preferred embodiment, a plurality of such units are arranged in laterally spaced apart relation with individual control of heating elements for each unit.

---

This invention relates to an electric broiler and more particularly to a broiler of the type described for use in the preparation of hamburgers, steaks, chops and other food products of a similar character.

Rotisserie type broilers have heretofore been produced but their use has been limited to meat products of substantial dimension and weight, such as chickens, roasts and the like, wherein the entire unit is rotated together in close proximity to the heat generating means. Such rotisseries are not capable of use for broiling individual hamburgers and the like or for broiling a plurality of hamburgers with separate means for controlling each individual hamburger to achieve the desired degree of doneness or for operation to broil less than the total number of hamburgers for which the broiler is designed.

Broilers for a plurality of hamburgers have also been produced but such broilers are not adapted for simultaneous use with one or more hamburgers with individual control for each hamburger and wherein the individual hamburgers are continuously rotated about their separate axes during the broiling operation to achieve an improved broiled product.

Thus, it is an object of this invention to produce an electrical broiler of the type described which is capable of use to broil a plurality of hamburgers and similar food products; in which one or more hamburgers can be simultaneously or intermittently introduced for broiling without interference with the operation of the broiler; in which the broiling operation for each hamburger is individually controlled to achieve the desired degree of doneness; in which the hamburgers are rotated between heating elements about their own axes thereby to enable retention of the juices of the broiled meat product; in which each hamburger is individually processed for movement into and out of the broling zone; in which the broiler can be operated with little, if any, previous skills; in which the broiler is of simple construction and easy in operation; in which the elements of the broiler are capable of ready removal for cleaning purposes thereby to retain an attractive appearance and to maintain sanitary conditions; in which the broiler contains means for indicating in advance the existence of any electrical failures and in which the broiler is of sturdy construction and capable of economical and efficient operation for the broiling of various kinds of meat and other food products.

These and other objects and advantages of this invention will hereinafter appear and for purposes of illustration, but not of limitation, embodiments of the invention are shown in the accompanying drawings, in which—

FIG. 3 is a side elevational view of the broiler shown in FIG. 1 with the side wall removed to show the interior thereof;

FIG. 4 is a sectional elevational view across the midsection of the broiler shown in FIG. 1;

FIG. 14 is an electrical diagram of the electrical connections in the apparatus of FIG. 1.

Figure 1:
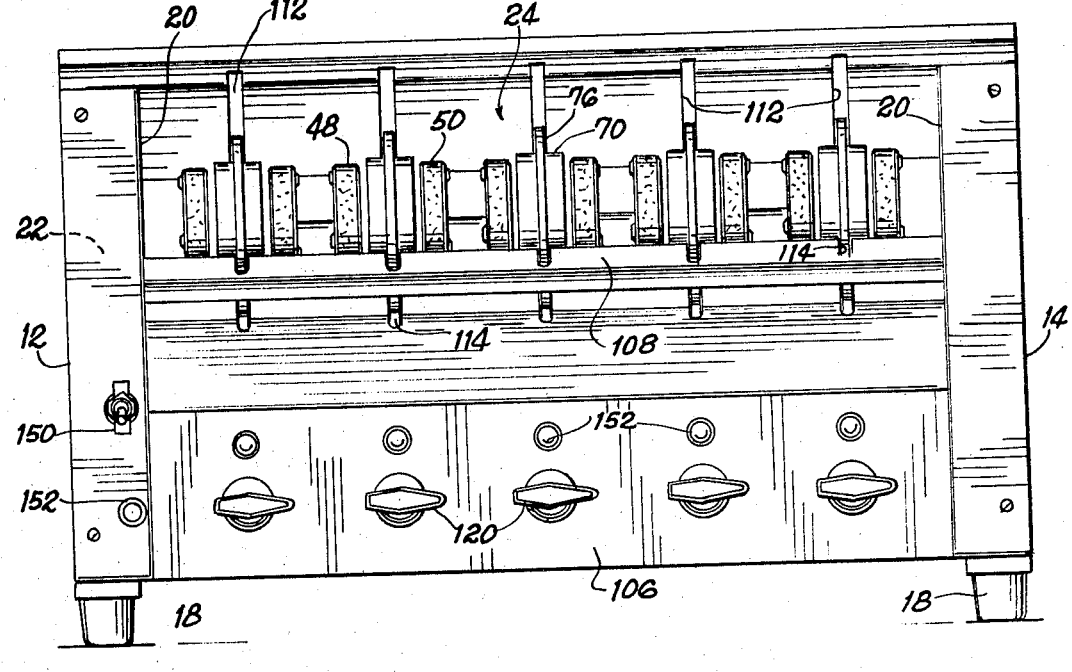
FIG. 1 is a front elevational view of a broiler embodying the features of this invention.
Figure 2:
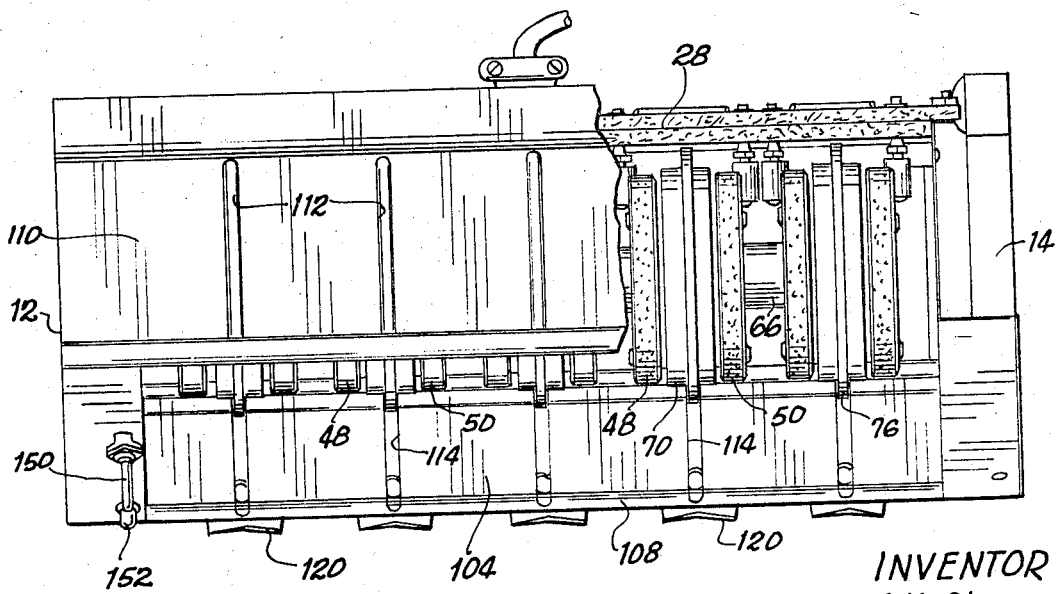
FIG. 2 is a top plan view of the broiler shown in FIG. 1 with portions broken away to show the interior thereof.
Figure 5:
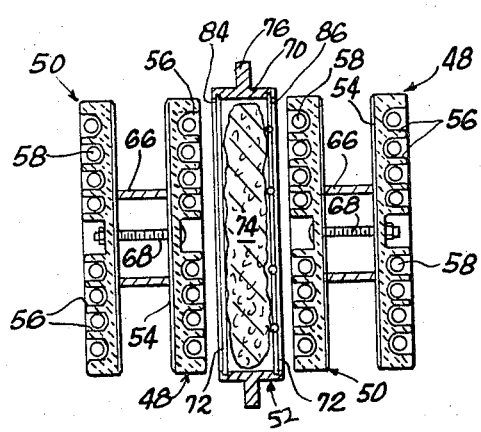
FIG. 5 is a sectional elevational view axially of a fragmentary portion of the broiler to show a single heating and broiling unit.
Figure 6:
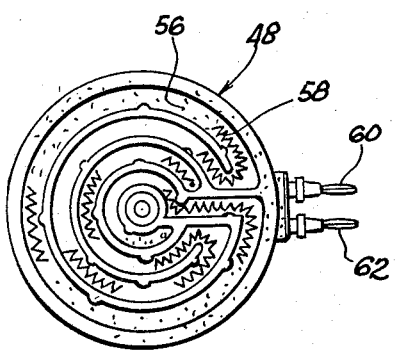
FIG. 6 is an elevational view of a heating unit.

The invention will hereinafter be described with reference to the use of the broiler for food products represented by hamburgers. It will be understood that other meats and the like food products such as steaks, chops, meat slices, and other broilable meats, dairy and vegetable products, may be processed in the broiler of this invention in the manner hereinafter described for hamburgers.

Referring now to the drawings, the broiler comprises a housing having a bottom wall 10, side walls 12 and 14, and a back wall 16 with the housing supported in spaced relation above a surface by legs 18. An inner side wall 20 is spaced a short distance inwardly from the outer side wall 12 to provide a narrow compartment 22 in which the controls and driving means are located in isolation from the broiler space 24 in which the broling operations are adapted to be carried out.

Spaced upwardly from the bottom wall 10 and inwardly from the back wall 16 are thermally insulated lower and rear walls 26 and 28 which separate the broiling space 24 from the compartment 30 in which the wiring and other connections are housed.

Rotatably supported at their outer ends in suitable bearings mounted in the side walls of the housing are a pair of elongate, rotatable, horizontally disposed shafts 32 and 34 which extend crosswise of the broiling space 24 in longitudinally spaced apart relation with the shafts being located a short distance above the lower wall 26. Means are provided for rotation of the shafts, such as sprockets 36 and 38 fixed onto the end portions of the shafts extending laterally beyond the side wall 20 and into the drive compartment 22 with a drive chain 40 trained about the sprockets 36 and 38 and a sprocket 42 fixed to the end of a driving shaft 44 of an electrical motor 46 mounted within the compartment 30.

Fixed to the housing in crosswise spaced relation are a plurality of facing pairs of heating elements 48 and 50 with the space between each pair being dimensioned removably to receive an open disc cage 52 therebetween. In the drawing, the pair of heating elements 48 and 50 are illustrated as porcelain disc plates 54 having grooves 56 recessed in the facing surfaces for receiving electrical resistance wires 58 in sealing relationship therein with the wires connecting to contact posts 60 and 62 which extend rearwardly through suitable openings through the rear wall 28 for connection by wires 64 to a switch control means hereinafter to be described.

It will be understood that other types of heating elements can be employed such as cal rod units, infrared ray heating untis, units for dielectric heating, and the like, in substitution for the resistance wire units described.

When a plurality of such pairs of heating elements are employed, they are arranged to extend crosswise through the broiling compartment 24 in spaced apart relation. Under such circumstances, the back side of the heating element in one pair will be arranged adjacent the back side of the heating element in an adjacent pair so that the adjacent heating elements in adjacent pairs can preferably be interconnected as by means of spacers 66 and interconnecting bolt and nut means 68 to effect a more rigid and stable assembly.

Since each pair of heating elements and the cage adapted to be received therebetween are substantially the same for the plurality of units, it will suffice to limit the description to a single unit including its operations and controls, with the understanding that the description thereof will apply equally to the other units in the system.

In the illustrated modification, the cage 52 comprises a tubular section 70 dimensioned to have a width less than the spaced relationship between the fixed pair of heating elements 48 and 50. An open grillwork 72 is removably secured in each end of the cage to block the open ends and leave a space therebetween sufficient to confine hamburger 74 within the cage between the grillwork thereby to retain the hamburger within the cage while exposing its opposite surfaces to the heat generated by the adjacent pair of heating elements 48 and 50.

The cylindrical section of the cage is dimensioned preferably to correspond to the area covered by the heating elements to provide for uniform exposure of the interior of the cage to the heat.

Means are provided for support of the cage on the rotatable shafts 32 and 34 to effect rotational movement of the cage and means are provided for stabilizing the position of the rotating cage between the heating elements to maintain the cage in upright position with a uniform spaced relationship between the cage and the heating elements.

Figure 7:
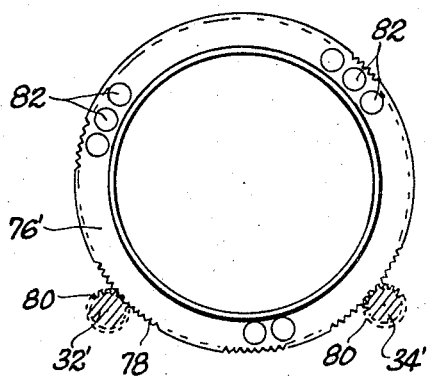
FIG. 7 is an elevational view of a modification in an electrical broiler embodying the features of this invention.

In the modification illustrated in FIGS. 1–5, the cage is formed with an annular flange or rim 76 extending outwardly radially from the center thereof whereby the rim is cradled between the rotatable shafts 32 and 34 rotatably to support the cage on the shafts. In the modification shown in FIGS. 7 and 8, both the peripheral surface of the rim 76' and the peripheral surface of the shafts 32' and 34' are formed with gear teeth 78 and 80 for positive inter-engagement between the cage rim and shaft for actuation of the cage in turning movement. Openings 82 are preferably, though not necessarily, provided in the annular flange 76'. The openings serve a number of useful purposes including material reduction in the weight of the cage, reduction in the amount of metal heated by the heating elements during the broiling operation, and the openings provide means for engagement of the cage with a suitable tool for removal of the hot cage from between the heating elements upon completion of the broiling operation.

Various means may be employed for gaining access to the interior of the cage for the insertion or the removal of the patty of meat or other food product. In the modification illustrated in FIGS. 4 and 5, the cylindrical section is formed with spaced annular grooves 84 and 86 adjacent the outer edges and the open grillwork 72 is formed of spring wire and is normally dimensioned to be received in seating engagement within the annular grooves but which can be contracted for decrease in dimension sufficient to enable displacement of the grillwork into and out of the cage for access to the interior thereof.

Figure 8:
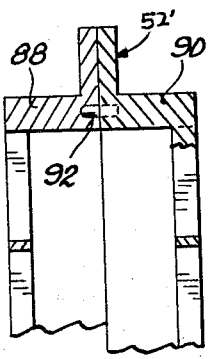
FIG. 8 is a sectional elevational view of a fragmentary portion of a cage, showing a modification in its construction.
Figure 9:
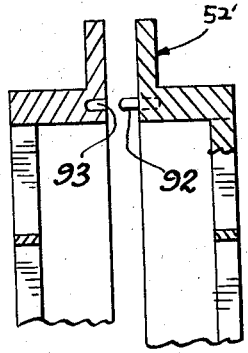
FIG. 9 is a sectional elevational view similar to that of FIG. 8 showing the cage elements in their separated relation.

Instead, the grillwork 72 can be fixed in position in the ends of the cylindrical section with the cylindrical section split down the middle to provide a pair of interfitting portions 88 and 90 held together by circumferentially spaced apart pins 92 extending axially from one part slidably to be received in corresponding recesses 93 in the other part thereby to enable separation of the halves for access to the interior of the cage and re-assembly of the halves into a cage in which the meat product is contained. This structure is shown in FIGURES 8 and 9 as a modified cage 52'.

The broiler is provided with a drip pan 94 having a flat bottom wall 96 dimensioned to have a width and length corresponding to the width and length of the broiler compartment 24 with end and side walls 98 turned upwardly from the side and back edges to define a trough with the upturned edges extending for a distance which is preferably less than the spaced relationship between the shafts 32 and 34 with the lower wall 26 to enable the drip pan to be slipped beneath the rollers into and out of position of use. A front wall 100 extends upwardly from the front edge of the bottom wall for a distance greater than the side and back walls 98 and the front wall is formed with a portion 102 above the level of the shaft 34 and extends rearwardly to overlie at least a portion of the shaft 34 and then a portion 104 which extends angularly forwardly and upwardly for a distance beyond the front wall 106 of the housing to provide a handle portion 108 for manual manipulation of the pan into and out of position to use.

Stabilization of the cage, without interference with its rotational movements while supported on the rotatable shafts and without interference with the freedom of movement into and out of the broiling position, can be achieved in a number of ways. In the modification illustrated in FIGS. 1–4 and 12, the housing is formed with a canopy 110 which extends forwardly and upwardly from the back wall 16 and spaced upwardly from the shafts by an amount less than the distance that the annular flange 76 extends when the cage is in position of use on the shafts. The canopy 110 is formed with laterally spaced apart slots 112 aligned with the center of each broiling unit, with the slots dimensioned to have a width slightly greater than the width of the annular flange to enable the flange to extend therethrough when the cage is inserted in position of use on the shafts between the heating elements. Similarly, slots 114 are formed in the angularly rearwardly extending and forwardly extending portions 104 and 102 of the drip pan. Thus the cage is free to move into and out of the broiler section and to come to rest on the shafts 32 and 34 while the annular flange 76 is engaged in peripherally spaced apart sections in the slotted canopy and drip pan to stabilize the position of the cage in upwright position.

Figure 10:
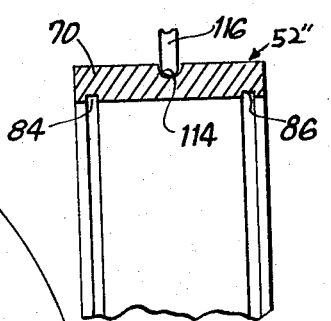
FIG. 10 is a sectional elevational view showing a further modification in a means for stabilizing the cage during rotational movement.

Another means for effecting stabilization of the cage during rotational movement on its supporting shafts is illustrated in FIG. 10 in which an annular groove 114 is provided in the outer peripheral surfaces of the cylindrical section 70 of cage 52 for receipt of one or more guide fingers 116 fixed to the housing and extending radially in guiding relationship into the groove. Such guide fingers are preferably arranged to extend forwardly from the rear wall 28 and/or downwardly from the canopy to engage the cage at circumferentially spaced apart portions out of the path of the movement of the cage into and out of position of use on the shafts.

Means are provided for operating the heating elements and for controlling the time that the heating elements are on to control the length of time that the meat patty is subjected to the broiling operation. Thus means are provided for setting the heating unit to achieve a predetermined amount of doneness and for shutting off the heating unit when the desired degree of doneness has been achieved thereby to avoid over-broiling. For this purpose, separate timers are provided for each grilling unit to regulate the time that the heating elements are on.

For example, the timer can be in the form of an electronic timer, or clock 118, as shown in FIG. 4 in which the time that the heating elements are on can be set by a timing knob 120 which extends forwardly from the front wall of the housing immediately below the grill unit with the knob 120 connected by a shaft 122 to the timing device having leads 124 extending therefrom to the grill pair.

Figure 13:
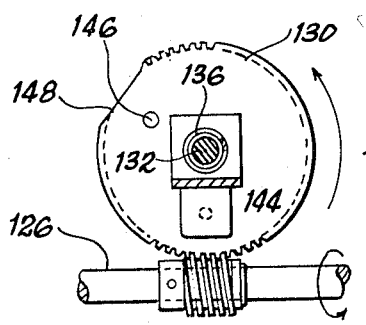
FIG. 13 is a sectional elevational view of the timing means shown in FIG. 12.

In the preferred modification, use is made of a mechanical means for controlling the period of time that the heating elements are on. One such means, illustrated in FIGS. 12 and 13, includes an elongate worm 126 which extends crosswise of the broiler and is supported at its ends in the side walls for free rotational movement. The worm supports a gear wheel 128 fixed for rotational movement therewith and the driving chain 40, connecting the driving motor with the shafts 32 and 34, is trained over the wheel 128 to effect continuous turning movement thereof during the period of the time that the motor is operated for turning the shafts.

A worm gear 130 is fixed onto the end of a shaft 132 which extends through the front face of the broiler and a control knob 134 is mounted on the through-extending portion of the shaft for endwise displacement of the shaft and gear between operative and inoperative positions and for rotational movement of the shaft and gear by an amount indicated by calibrations for the desired degree of doneness. The worm gear is displaced out of engagement with the worm 126 to enable rotational movement when displaced to inoperative position and it returns into engagement with the worm for rotational movement by the worm when in operative position.

Means are provided constantly to urge the worm gear 130 and shaft 132 to operative position into engagement with the worm. For this purpose, use can be made of a coil spring 136 arranged concentrically about the shaft 132 with the forward end of the spring bearing against a stop disc 138 fixed to the shaft while the other end bears against the wall 140 of a bracket 142 fixed to the housing.

Microswitch 144 is fixed onto the bracket with the switch button bearing against the face of the worm gear 130 offset from its axis. The worm gear is provided with an opening 146 in circumferential alignment with the button whereby the switch is made during engagement with the worm gear and becomes broken when the gear is rotated for alignment of the opening 146 with the button to enable the outward displacement thereof.

A peripheral portion 148 of the worm gear, in radial alignment with the worm when the button enters the opening 146, is cut away to effect discontinuance of the operative engagement between the worm 126 and the gear 130 when the switch is broken thereby to enable continuous movement of the worm without turning the gear.

In operation, the broiler is plugged into a conventional electrical outlet for connection of the broiler to an electrical power source. Actuation of the switch member 150 to "on" position operates to connect the driving motor with the power source whereby the sprocket 42 is rotated to effect operation of the driving chain and corresponding rotational movements of the shafts 32, 34 and the sprocket 128. Rotational movement of the shafts will be imparted to the empty cages which are at rest thereon. Lights 152, connected in series with the circuit, will also become lit to indicate that all elements are "go."

When it is desired to broil a hamburger or the like, one of the cages is removed by lifting from the broiler. The grillwork is removed from one of the sides, in the modification of FIGS. 4, 5 and 7, or the cylindrical sections are separated, in the modification shown in FIGS. 8 and 9, to enable a patty of meat to be placed therein. Thereafter, the grillwork is replaced or the sections are joined to enclose the patty within the open cage and the loaded cage is then dropped back into the broiling section onto the rotating shafts between a pair of heating elements whereby the cage with the meat patty immediately begins to rotate about its own axis between the fixed heating elements.

Heating is initiated for the particular unit by depression of the aligned knob 134 and by turning the knob to the calibration indicated for the degree of doneness desired. The attached worm gear 130 is rotated a correponding amount from starting position to space the opening 146 from the microswitch arm. The knob and worm gear are returned from operative to inoperative position upon release of the knob 134 thereby to depress the switch button to make the switch and return the worm gear into operative engagement with the worm 126.

While the switch is made, current passes into the heating coils for the generation of heat while the patty is being rotated between the heating elements. Heating is continued with constant rotation of the cage until the worm rotates the gear 130 to starting position whereupon the opening 146 in the gear comes into endwise alignment with the switch button to enable entrance thereof to break the switch.

While rotation of the cage will continue, the heat is shut off to prevent additional broiling of the meat product whereby it becomes broiled to the predetermined degree of doneness and then stops. When the timer light 154, which is lit while the switch is made, signals that heating has been discontinued and the broiling operation has been completed, the operator can remove the cage from the broiling section and open the cage to release the broiled hamburger.

It will be apparent from the foregoing that the device may be used to broil one or more patties inserted at the same or at different times for broiling in adjacent units and that each unit can be operated individually to effect a predetermined amount of broiling without interfering with the broiling operation carried out with other units.

It will be apparent also that the type of broiling that is achieved by the device of this invention represents the ideal type of broiling for individual tastes since the degree of doneness can be predetermined with automatic shut-off when the desired state has been reached so that additional broiling will not occur.

The conditions most desirable for broiling are achieved for individual meat products, such as hamburgers, steaks, chops and the like, by reason of the ability to remain as individual meat products between their own pair of heaters in closely spaced apart relationship on opposite sides thereof whereby all of the juices in the meat are retained while providing for uniform heating and broiling from opposite sides and with uniform distribution of heat across the product.

Drippings fall vertically downwardly into the underlying drip pan 94 free of any of the heating elements or other parts whereby the minimum amount of cleaning is required to maintain the desired cleanliness for appearance and sanitation. Removal of the drip pan for cleaning can be achieved by manipulation of the handle to slide the drip pan forwardly for removal from the housing and for replacement in the same manner when the cleaning operations have been completed.

Figure 11:
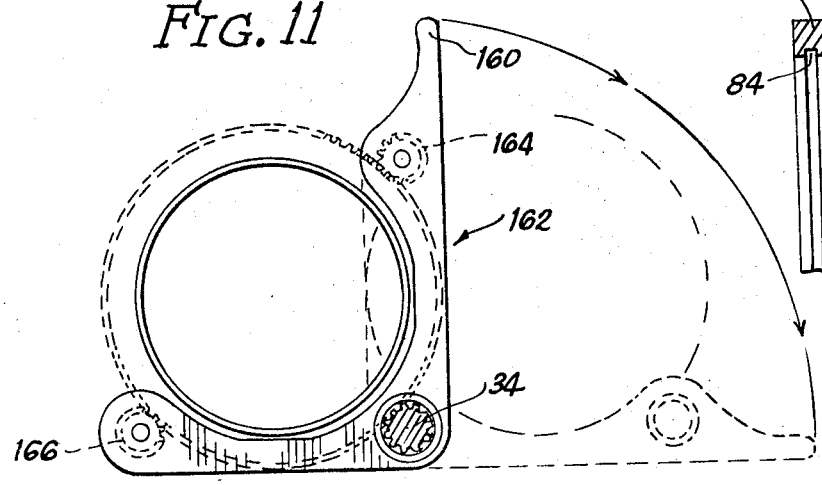
FIG. 11 is a side plan view showing a further modification in a broiler of this invention.
Figure 12:
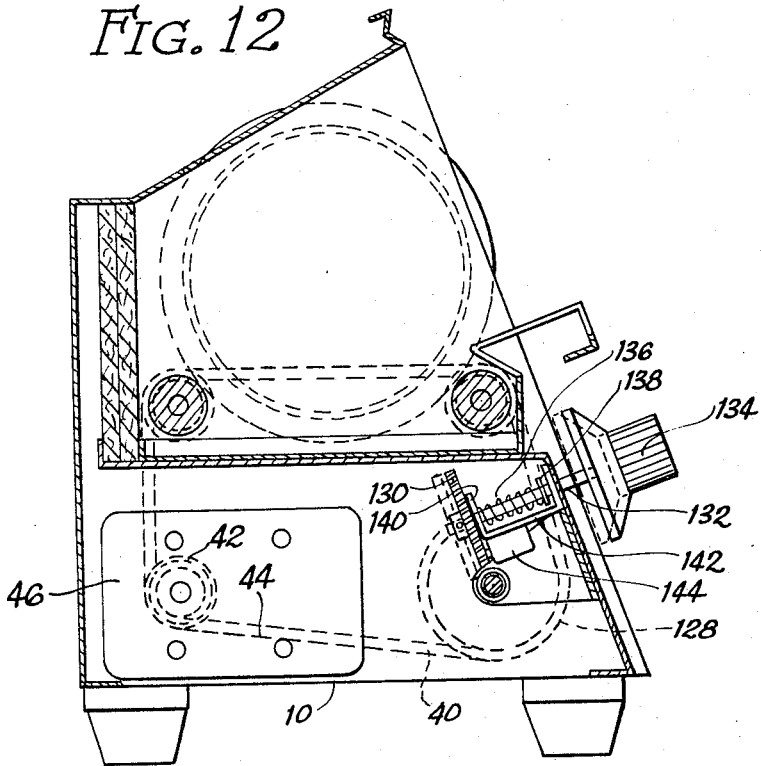
FIG. 12 is a sectional elevational view crosswise of the broiler shown in FIG. 1 to illustrate the timing means.

In the modification shown in FIG. 11, the cage is displaced into and out of the broiling section by means of a handle 160. For this purpose, the forward roller 34 constitutes the only driving roller. Each cage is provided with its own L-shaped bracket 162 which is mounted for rocking movement about the axis of the driving roller and which is provided with a pair of idler rollers 164 and 166 mounted in the end portions of the bracket arms for free rotational movement whereby the cage is cradled between the three rollers, with the idler roller spaced circumferentially by an amount not greater than 180° so that the cage can be displaced into and out of the cradle.

As illustrated in FIG. 11, the bracket is rocked forwardly to its inoperative position, illustrated by the broken lines. The cage can be removed by lifting from the cradle to enable insertion of a meat patty or for the removal of a broiled patty. When loaded, the cage is returned onto the cradle and the bracket is rocked to raised position whereby the cage is displaced inwardly into the space between the heating elements to effect the desired broiling operation while at rest upon the driving roller 34 and the idler roller 66 for continuous turning movement.

Each individual broiling position is provided with its own bracket 162 for rocking the cage into and out of broiling position thereby to provide for easier access to the cage.

It will be understood that the heating elements can be in the form of Selas type burners or other gas heating element with the burners in the face of the disc members and with valves instead of switch members for control of gas flow to the burners.

It will be understood that changes may be made in the details of construction, arrangement and operation without departing from the spirit of the invention, especially as defined in the following claims.

I claim:

1. In a broiler comprising horizontally disposed, laterally spaced supporting rollers, means for rotating at least one of said rollers, a plurality of pairs of heating elements mounted above said rollers, each pair of elements defining an open space, an open cage having a width less than the spaced relationship between the elements and an outer portion of circular shape dimensioned to have a diameter greater than the spaced relationship between the rollers whereby the cage can be moved onto and off the rollers between the heating elements while being cradled between the rollers for rotational movement of the cage between the heating elements, means for opening and closing the cage for access to the interior thereof for displacement of a product to be broiled into and out of the cage, means connecting the heating elements to a power source for the generation of heat for broiling the food products rotated in the cage therebetween, and adjustable timing means for selectively operating the individual pairs of heating elements, said timing means including means adapted to be selectively connected to a rotating element operatively connected to said means for rotating said rollers, and means for automatically removing said timing means for engagement with said rotating element to thereby turn off the heating elements when the desired broiling time has elapsed.

2. A broiler as claimed in claim 1 in which the means for rotating the rollers comprises an endless chain, spur gears on the ends of each of the rollers operatively engaged by the chain and an electric motor operatively engaging the chain drive for actuation of same.

3. A broiler as claimed in claim 1 wherein said rotating element comprises a worm, and wherein the timing means comprises an electrical switch means, a worm gear mounted for axial displacement into and out of engagement with the worm with the worm gear having a portion cut out in the periphery corresponding to zero position whereby the worm gear becomes disengaged from the worm when in zero position, means for displacement of the worm gear out of engagement with the worm and for turning the worm gear from zero position, means constantly urging the worm gear in the direction for engagement with the worm, and in which the switch means is in operative engagement with the worm gear to make the switch when other than in zero position and to break the switch when returned to zero position.

4. A broiler as claimed in claim 1 in which said plurality of pairs of heating elements are arranged in longitudinally spaced apart relation axially over the rollers to provide a plurality of separate broiling units.

5. A broiler as claimed in claim 1 in which the cage comprises a cylindrical section and in which the means for access to the interior comprises an open grillwork and means for releasably securing the open grillwork in the end portions of the cylindrical section.

6. A broiler as claimed in claim 1 in which the cage comprises a cylindrical section and in which the means for access to the interior comprises subdivision of the cylindrical section into a pair of interconnecting parts.

7. A broiler as claimed in claim 1 in which the heating elements are formed with electrical resistance wires.

8. A broiler as claimed in claim 1 in which the peripheral surface of the driven roller is serrated and in which the periphery of the cage is similarly serrated for operative engagement therebetween when the cage is positioned on the rollers.

9. A broiler as claimed in claim 1 which includes a drip pan covering the area beneath the rollers and means for displacement of the drip pan into and out of position beneath the rollers.

10. A broiler as claimed in claim 1 in which one of the rollers is a driven roller and which includes a lever pivoted intermediate its ends on the axis of the driven roller and in which the other roller is mounted for free rotational movement on a spaced portion of the lever for rocking movement of the lever about its pivot for displacement of the other roller between operative position horizontally disposed with respect to the driven roller for support of the cage between heating elements and raised position for delivery of the cage from between the heating elements.

References Cited

UNITED STATES PATENTS

| 1,361,183 | 12/1920 | Reed | 99—427 XR |
|---|---|---|---|
| 2,027,002 | 1/1936 | Spang | 99—391 XR |
| 2,047,046 | 7/1936 | Wade | 99—327 |
| 2,198,134 | 4/1940 | Spiegl | 99—393 |
| 2,327,354 | 8/1943 | Klein | 99—392 |
| 2,400,640 | 5/1946 | Hanson et al. | 99—391 |
| 2,629,314 | 2/1953 | Varady | 99—427 XR |
| 2,689,517 | 9/1954 | Angelus | 99—345 |
| 2,722,172 | 11/1955 | Garbo | 99—346 |
| 2,787,947 | 4/1957 | Schatten et al. | 99—332 |
| 2,907,267 | 10/1959 | Lindsey | 99—339 |
| 2,915,959 | 12/1959 | Stott | 99—391 XR |
| 3,098,426 | 7/1963 | Lee | 99—339 |
| 2,180,225 | 11/1939 | DeWHurst | 68—140 |
| 2,646,495 | 7/1953 | Dornbush | 219—391 |

BILLY J. WILHITE, Primary Examiner.

U.S. Cl. X.R.

99—392, 393, 400, 427, 443, 446, 448, 449; 219—392, 409